United States Patent [19]
Allan et al.

[11] 3,965,352
[45] June 22, 1976

[54] X-RAY SYSTEM WITH ELECTROPHORETIC IMAGING

[75] Inventors: Frank V. Allan, Los Angeles; John B. Fenn, Jr., Canoga Park; John H. Lewis, Los Angeles, all of Calif.

[73] Assignee: Xonics, Inc., Van Nuys, Calif.

[22] Filed: Apr. 24, 1975

[21] Appl. No.: 571,220

[52] U.S. Cl............................ 250/315 A; 250/336; 250/402
[51] Int. Cl.$^2$...................... G03G 13/00; G01J 1/00; H05G 1/00
[58] Field of Search................ 250/315 A, 315, 336, 250/402, 401

[56] References Cited
UNITED STATES PATENTS
3,873,833  3/1975  Allan et al. ..................... 250/315 A Primary Examiner—Alfred E. Smith
Assistant Examiner—T. N. Grigsby
Attorney, Agent, or Firm—Harris, Kern, Wallen & Tinsley

[57] ABSTRACT

An electronradiography imaging chamber providing a real time visual image. An electronradiography imaging chamber with electrophoretic particles in the electrode gap, with the particles being selectively moved to a transparent electrode as a result of the electrostatic charge image formed by absorbtion of incoming X-ray radiation in the gap. A dark field illumination viewing configuration with the deposited particles providing light scattering giving a visual image with low radiation dosage. An imaging chamber which can be cyclically operated at a relatively high repetition rate, typically 10 to 20 images per second, thereby providing real time viewing of the object.

23 Claims, 31 Drawing Figures

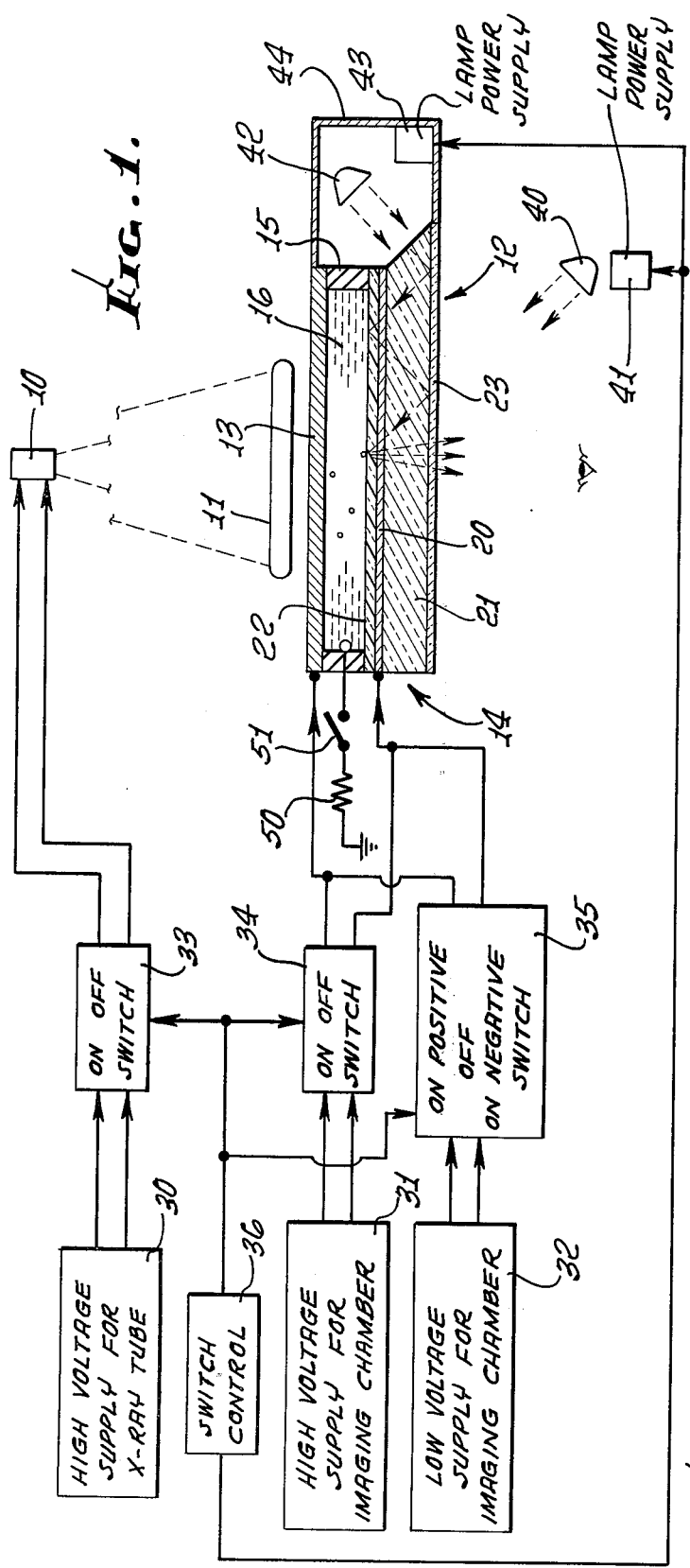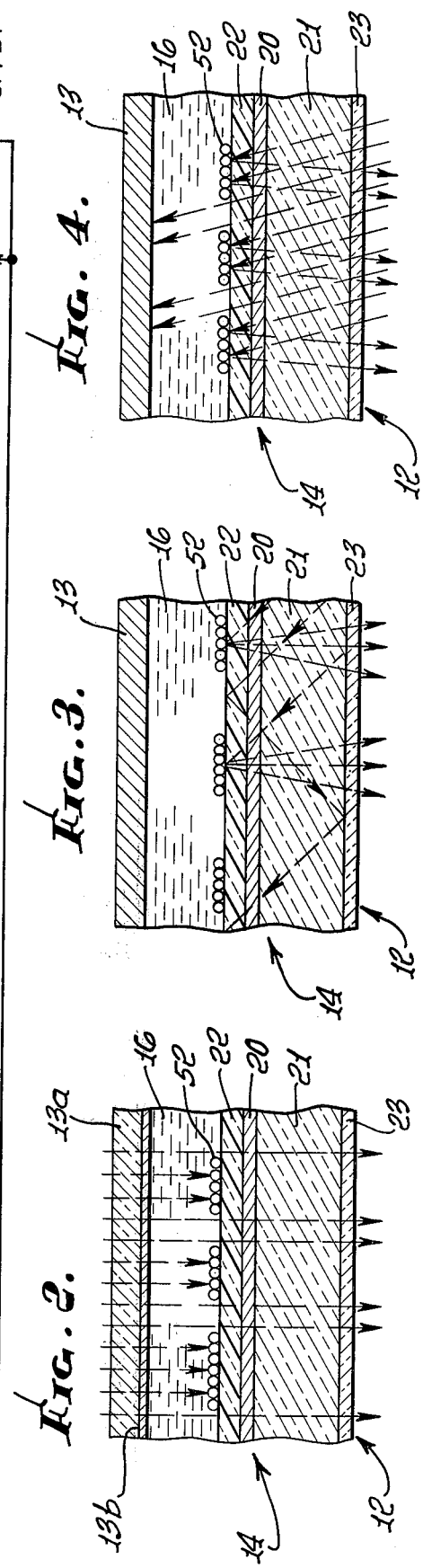

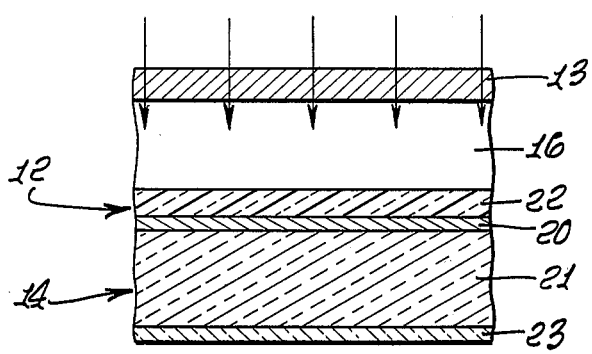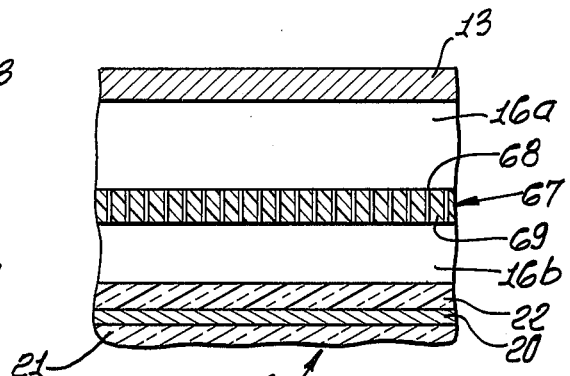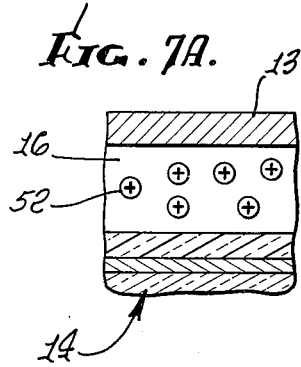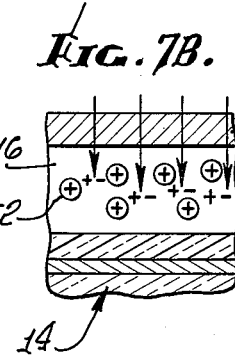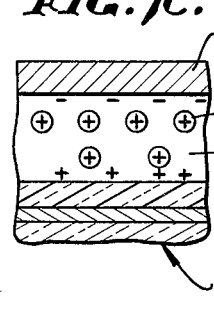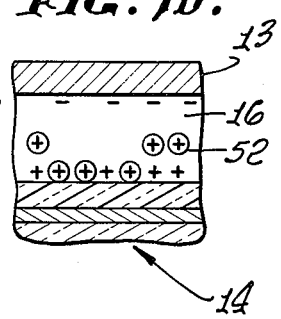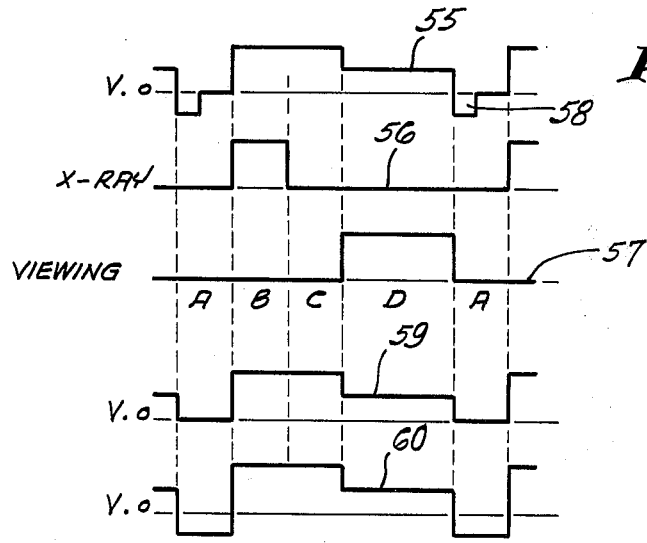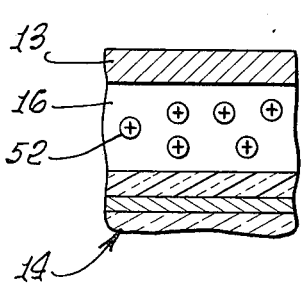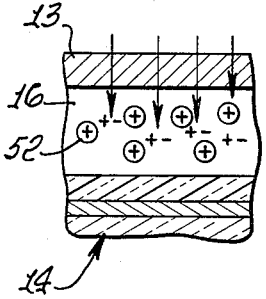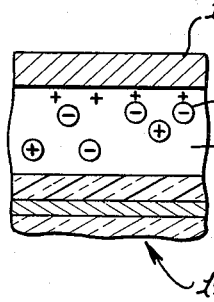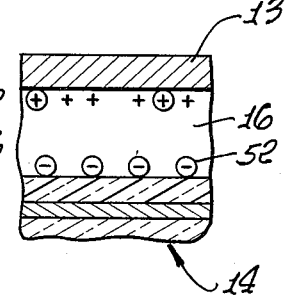

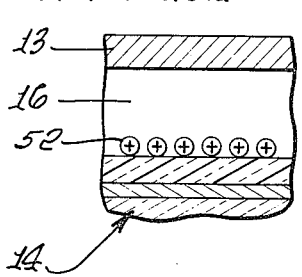 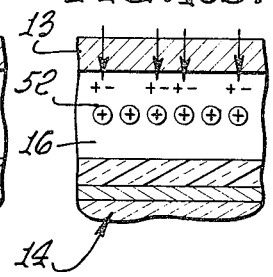 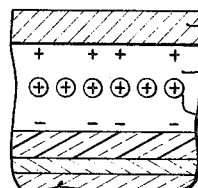 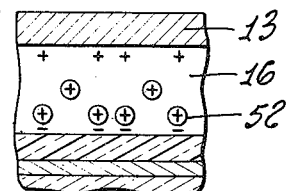
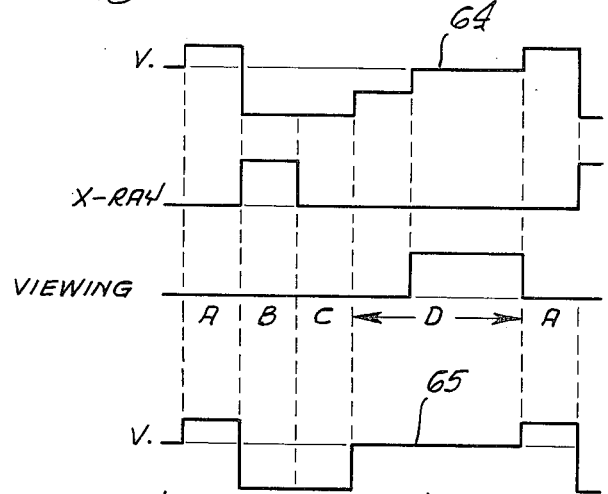
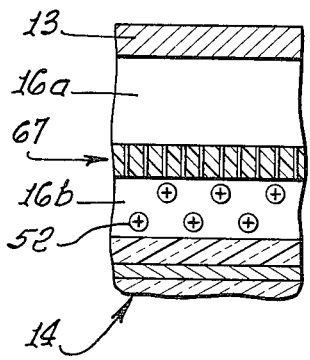 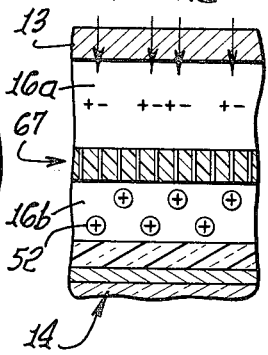 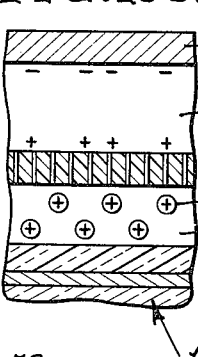 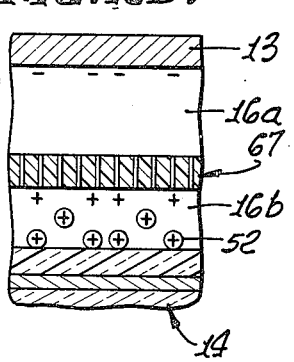
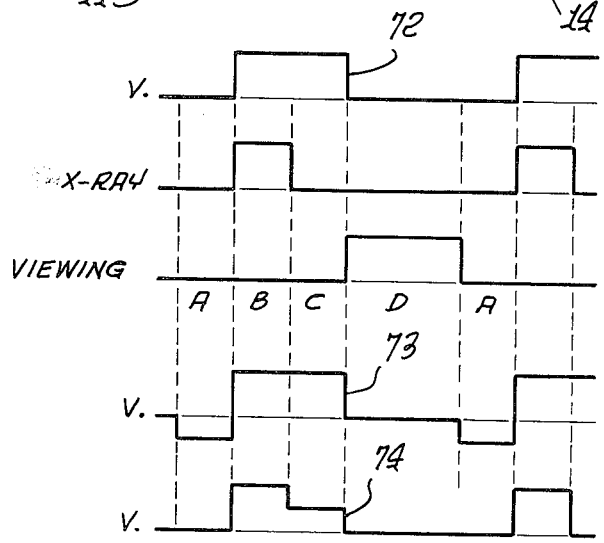

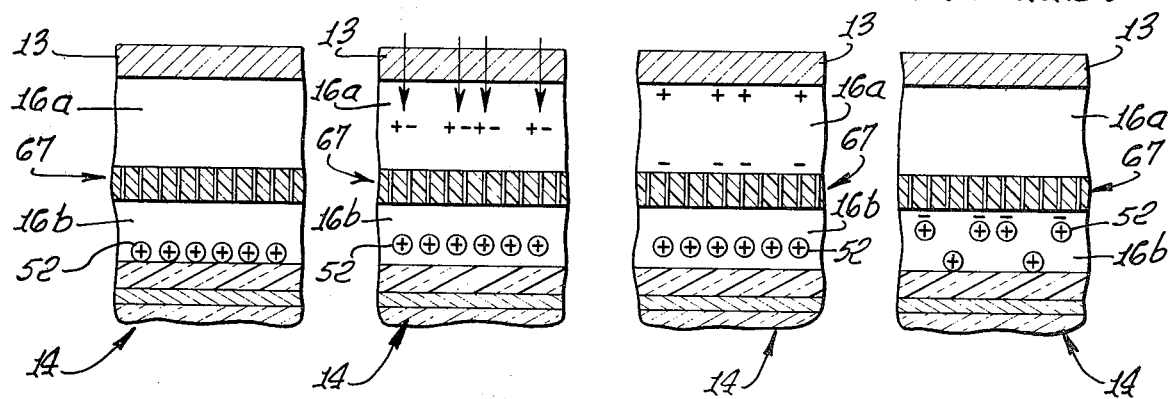
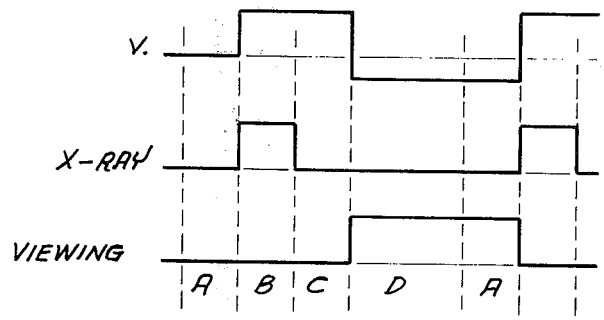
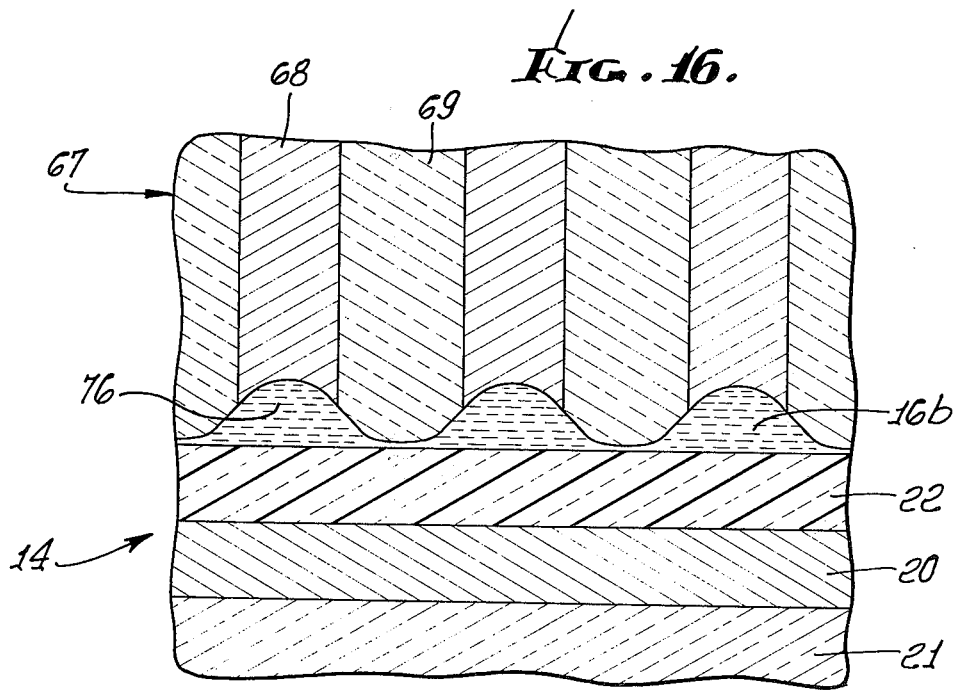

X-RAY SYSTEM WITH ELECTROPHORETIC IMAGING

BACKGROUND OF THE INVENTION

This invention relates to electronradiography and in particular, to X-ray systems providing for real time imaging.

Present methods of real time imaging of X-rays are unsatisfactory for a variety of reasons. Fluoroscopy requires a high dosage of X-rays, has relatively poor resolution and requires dark adpatation for the viewer. In order to overcome the last limitation, image intensifying tubes are employed. Such tubes produce a small bright image which has to be viewed using either magnifying optics or a television chain, either being a relatively complex setup. The size of the area being observed is limited by the size of the intensifier tube.

It is an object of the present invention to provide a new and improved X-ray imaging system which can be used for real time imaging. A further object is to provide such a system utilizing electronradiography for the formation of an electrostatic charge image with an improved imaging chamber for converting the electrostatic charge image to a visible image.

In the conventional electronradiography system, a dielectric receptor sheet is positioned at an electrode surface in a gap between a pair of electrodes. An X-ray absorber and electron and positive ion emitter is maintained in the gap between the electrodes. A source of X-rays is directed to the gap past the object being X-rayed, and incoming X-ray photons generate electrons and positive ions in the gap which are attracted towards the respective electrodes. Charges are collected on a dielectric receptor sheet providing a latent electrostatic charge image of the object, and this image is then developed to a visual image by standard xerographic techniques with the density of the deposited toner powder particles being a function of the magnitude of the electrostatic charge. An electronradiography system utilizing gas as the absorber is shown in U.S. Pat. No. 3,774,029. An electronradiography system utilizing liquid as the absorber is shown in copending application Ser. No. 456,532, filed Apr. 1, 1974, now U.S. Pat. No. 3,873,833 and assigned to the same assignee as the present application.

It is an object of the present invention to provide a new and improved electronradiography system for producing a directly viewable image at the imaging chamber utilizing the electrostatic charge image for creating the visual image, while omitting the receptor sheet and the time required for converting the charge image on the receptor sheet to a visible image. A further object is to provide such a system wherein the visible image is formed directly in the imaging chamber substantially simultaneously with the X-ray exposure, providing real time imaging. A further object is to provide such a system wherein the X-ray exposure and image viewing sequence may be repeated cyclically at a relatively high rate, such as in the order of 10 to 20 images per second, resulting in a substantially continuous image for the viewer.

SUMMARY OF THE INVENTION

The imaging chamber of the present invention includes first and second electrodes in spaced relation with a gap therebetween, and an X-ray absorber and electron and positive ion emitter in the gap. Electrophoretic particles are also suspended in the gap, and an appropriate electrical power supply is provided for connection across the electrodes. An electrostatic charge image is formed during X-ray radiation and this charge image is utilized in selectively depositing electrophoretic particles at one of the electrodes which is transparent for viewing the deposited particles through the electrode. Liquid absorbers and gas absorbers may be utilized. The electrophoretic particles and the absorber may be mixed in the same portion of the gap, or a two section gap may be utilized with the absorber and the particles separated by an anisotropic plate. The electrophoretic particle image may be viewed by transmitted light, by reflected light, and by scattered light resulting from a dark field illumination configuration. In the preferred embodiment, the X-ray exposure and image viewing steps are repeated cyclically to provide substantially continuous real time imaging.

BRIEF DESCRIPTION OF THE DRAWINGS

FIG. 1 is a diagramatic illustration of an electronradiography system with an imaging chamber incorporating the presently preferred embodiment of the invention;

FIGS. 2, 3 and 4 illustrate three types of illumination for viewing useable with the embodiment of FIG. 1;

FIG. 5 is an enlarged partial sectional view showing the electrode construction of the chamber of FIG. 1;

FIG. 6 is a view similar to that of FIG. 5 showing an alternative embodiment with two gap sections;

FIGS. 7A–7D are diagramatic illustrations similar to that of FIG. 5 illustrating one mode of operation of the invention;

FIG. 8 is a timing diagram for FIGS. 7A–7D;

FIGS. 9A–9D are similar to FIGS. 7A–7D showing an alternative mode of operation;

FIGS. 10A–10D are similar to FIGS. 7A–7D illustrating another mode of operation;

FIG. 11 is a timing diagram for FIGS. 10A–10D;

FIGS. 12A–12D are views similar to that of FIG. 6 illustrating another mode of operation;

FIG. 13 is a timing diagram for FIGS. 12A–12D;

FIGS. 14A–14D are similar to FIGS. 12A–12D illustrating another mode of operation;

FIG. 15 is a timing diagram for FIGS. 14A–14D; and

FIG. 16 is an enlarged partial sectional view showing an alternative construction for the configuration of FIG. 6.

DESCRIPTION OF THE PREFERRED EMBODIMENTS

In the electronradiography system of FIG. 1, an X-ray source 10 directs radiation through a body 11 to an imaging chamber 12. The imaging chamber includes an upper electrode 13 and a lower electrode 14 separated by spacers 15 defining a gap 16 between the electrodes.

The upper electrode 13 should be of a material which is relatively transparent to X-ray radiation and beryllium is a preferred metal. The lower electrode 14 should be relatively transparent optically and typically may comprise a thin transparent film 20 of an electrical conducting material such as a metal oxide on a glass or plastic support plate 21. A dielectric film 22 is applied on the gap surface of the electrode film 20, and typically may be a thin plastic sheet. If desired, a conventional non-reflecting film 23 may be applied on the outer surface of the support plate 21.

Electrical power supplies are provided for the X-ray source and the imaging chamber and typically may include a high voltage supply 30 for the X-ray tube, a high voltage supply 31 for the imaging chamber, and a low voltage supply 32 for the imaging chamber. The voltage supply to the X-ray source 10 is controlled by an on-off switch 33. The voltage supply to the imaging chamber 12 is controlled by an on-off switch 34 and another switch 35 which can provide a positive supply, a negative supply and an off condition. The sequence of operation of the switches 33, 34, 35 is controlled by a switch control unit 36.

The image formed in the chamber 12 may be viewed by transmitted light if both electrodes are optically transparent, by reflected light or by scattered light. FIG. 1 illustrates a lamp 40 energized from a power supply 41 directing light onto the electrode 14 for reflection illumination. Another lamp 42 energized from a power supply 43 is mounted in a closed housing 44 at one edge of the imaging chamber for directing light into the plate 21 to provide dark field illumination and scattered light viewing.

In the embodiment illustrated, the gap 16 between the electrodes is filled with a liquid X-ray absorber and electron and positive ion emitter. Reference may be had to the aforementioned copending application Ser. No. 456,532 now U.S. Pat. No. 3,873,833 for information on the liquid absorber and emitter. Electrophoretic particles are suspended in the liquid in the gap.

One mode of operation of the system of FIG. 1 is illustrated in FIGS. 7 and 8, with the horizontal axis of the timing diagrams of FIG. 8 representing time with one cycle of operation divided into segments A, B, C and D. The voltage across the electrodes is represented by curve 55, the X-ray source on time is represented by the curve 56, and the viewing time is represented by the curve 57. At the end of time segment A, there is no voltage across the electrodes and the electrophoretic particles 52 are dispersed throughout the liquid absorber in the gap 16. In time segment B, the X-ray source is energized and a high voltage is connected across the electrodes with the electrode 14 negative. Incoming X-rays are absorbed in the gap and electrons (or negative ions) and positive ions are generated, as indicated in FIG. 7B. The electrons are rapidly moved to the electrode 13 and the positive ions are rapidly moved to the electrode 14 under the influence of the field through the gap, providing the electrostatic charge image is as shown in FIG. 7C. The electrostatic charge images remain after the X-ray source is turned off. The electrophoretic particles 52 are relatively bulky compared to the electrons and positive ions and therefore do not travel nearly as fast as the electrons and positive ions, that is, there is a substantial differential in the mobility of the particles and the electrons and ions in the liquid absorber. Hence as shown in FIG. 7C, the particles remain in the liquid during the relatively short time the high voltage is connected across the electrodes. The voltage across the electrodes is reduced in time segment D and electrophoretic particles are attached to the electrode 14 at those portions which do not have positive ions thereon. The positively charged electrophoretic particles are repelled by the positive ions on the electrode 14. This selective depositing of the particles as shown in FIG. 7D provides the desired image which can be viewed during the time segment D.

At the end of the viewing time, the potential across the electrodes may be reversed for a short time, as indicated at 58 to move the particles from the electrode back into the dispersion. A typical exposure and viewing cycle may occur in one-tenth of a second, providing ten viewing frames per second. It is desirable to discharge any remaining charge in the liquid before the next X-ray exposure and this may be accomplished by providing an electrical connection from the liquid to ground through a resistor 50 and a switch 51 (FIG. 1). The switch 51 may be closed during time segment A to accomplish the discharge. Alternatively, the switch 51 may be omitted with a direct connection through the resistor to circuit ground, with the parameters chosen so that the ground connection does not adversely affect the operation during X-ray exposure but does accomplish the desired discharge function.

It will be readily understood that the specific voltages shown in curve 55 are not required and that various other voltage application schemes can be utilized. Two alternatives are shown in curves 59 and 60. In curve 59, there is no reverse voltage applied and in curve 60, the reverse voltage is applied throughout time segment A. In another alternative, the time segment C may be omitted.

Three modes of viewing are shown in FIGS. 2, 3 and 4. In the transillumination mode of FIG. 2, light enters the gap 16 through the electrode 13, with light being blocked by the deposited particles and passing through the electrode 14 in areas not blocked by deposited particles. For this mode, the electrode 13 needs to be relatively transparent and typically may comprise a glass plate 13a with a thin electrical conducting film 13b on the inner surface. A reflection illumination mode is shown in FIG. 4, with light directed onto the electrode 14 and being reflected by deposited particles. This mode is preferred for use when taking photographs of the image, since it provides a relatively high illumination.

A dark field illumination mode is shown in FIG. 3. A light wave of substantially total internal reflection is produced in the plate 21. This may be achieved by introducing light from the lamp 42 into the edge of the plate 21 at the appropriate angle for achieving internal reflection at the interfaces. When a small particle rests on the external surface at the reflection interface, it will disrupt the incident internal wave and scatter the radiation, thus becoming a point source of light when viewed from the exterior of the imaging chamber. Other locations on the inner surface of the electrode 14 which do not have a particle to serve as a scattering center will appear perfectly black if the electrode 13 is opaque.

The dark field illumination mode is preferred for direct viewing of the image, since it can be obtained with fewer deposited particles and a lower X-ray dosage. When it is desired to make a spot film or photograph of the image, the system may be switched to the reflection illumination mode with the X-ray dosage increased for a single pulse, thus creating a higher electrostatic charge and a greater particle deposit at the viewing window. During this time, the lamp power supply 41 may be turned on to energize the lamp 40, rather than the lamp power supply 43. This switching may be accomplished by the switch control unit 36.

An alternative mode of operation utilizing ion attachment is shown in FIG. 9A–9D. FIGS. 9A and 9B show the same mode of operation as in FIGS. 7A and 7B respectively. However, the electrophoretic particles 52 are chosen such that the electrons (negative ions) produced by the incoming X-ray radiation attach to electrophoretic particles changing the charge from positive to negative. This is illustrated in FIG. 9C. A relatively low voltage is connected across the electrodes, with the electrode 14 positive. The negatively charged particles are then deposited on electrode 14 and the positive ions and remaining positively charged particles are deposited on electrode 13 producing the desired visual image at electrode 14.

Another mode of operation is illustrated in FIGS. 10A-10D and 11. In time segment A, a low voltage is applied across the electrodes with the electrode 14 negative thereby attracting the particles to the electrode 14. In time segment B, a high voltage of the opposite polarity is connected across the electrodes and the incoming X-rays produce the electrons and positive ions, which are then attracted to the corresponding electrodes producing the electrostatic images as shown in FIG. 10C. The potential across the electrodes is then reduced to a relatively low value or zero and the electrons at the electrode 14 attract particles for deposit on the electrode 14, while particles are not attracted to those portions of the electrode 14 not having a charge thereon. This is illustrated in FIG. 10D. Typical timing curves for this mode are shown in FIG. 11, with two alternative voltage curves 64, 65.

An enlarged view of a portion of the imaging chamber of FIG. 1 is shown in FIG. 5, and an alternative embodiment for the imaging chamber is shown in FIG. 6. In this latter embodiment, the gap 16 is divided into two gap portions 16a and 16b by an anisotropic plate 67. The X-ray absorber and electron and positive ion emitter is positioned in the gap portion 16a and the electrophoretic particles 52 are suspended in a suitable liquid dispersant in the gap portion 16b. Typically, the anisotropic plate 67 may comprise a plurality of electrical conducting pins 68 in a non-conducting support 69, typically a non-conducting glass. The absorber and emitter in gap portion 16a may be a liquid as in the previously described embodiment, or may be a gas and reference may be had to the aforementioned U.S. Pat. No. 3,774,029 for additional data on a gas absorber and emitter.

One mode of operation of the embodiment of FIG. 6 is illustrated in FIGS. 12A-12D and 13. In time segment B, the incoming X-ray radiation produces the electrons and positive ions in the gap portion 16a and these are attracted to the electrode 13 and the plate 67 as shown in FIG. 12C. The charges at the plate 67 are transferred through the plate by the conducting pins and repel particles toward the electrode 14, as shown in FIG. 12D, thereby creating the visual image of the deposited particles on the electrode 14. When operating with the voltage curve 72, the charges are permitted to dissipate during time segments D and A. Alternatively, a reverse voltage may be applied during time segment A as shown in curve 73 for removing the particles from the electrode 14. The voltage curve 74 shows another alternative wherein the electrode potential is reduced to a relatively low value when the X-ray source is turned off.

Another alternative mode of operation for the embodiment of FIG. 6 is shown in FIGS. 14A-14D and 15. A low voltage is applied across the electrodes, with the electrode 14 negative to hold the particles on the electrode during time segment A. The applied voltage is reversed to a high voltage during X-ray exposure in time segment B, moving the particles away from the electrode 14. As shown in FIG. 14C, the electrons forming the electrostatic charge image are transferred through the plate 67 to the gap 16b and attract the positively charged particles. A low voltage is applied across the electrodes for attracting the remaining particles to the electrode 14 to provide the visible image as shown in 14D. During the time segment D, the electrostatic charges will dissipate and the particles previously attracted toward the plate 67 will be deposited on the electrode 14, as shown in FIG. 14A. The various modes of operation specifically described herein are for illustrative purposes and other modes of operation will readily be apparent to those understanding the specifically described modes.

The gaps between the electrodes have been shown relatively large in the drawings. However this is for illustrative purposes only and the gaps are relatively small. When a liquid absorber and emitter is used, a gap typically is in the order of one milemeter. With a gas absorber, the gap typically is in the order of a few milemeters. An alternative embodiment for the pin matrix plate 67 particularly suited for maintaining a very small gap portion 16b is shown in FIG. 16. In this embodiment, the ends of the pins 68 at the particle gap terminate below the surface of the support material 69 providing wells or zones 76 for the electrophoretic particle dispersion, with the surface of the support material 69 close to or engaging the dielectric film 22 of the electrode 14.

Electrophoretic particles and dispersions are not new per se, and typical examples are given in U.S. Pat. No. 3,668,106. Light colored particles in a dark liquid and dark particles in a light or colorless liquid may be utilized, depending upon the type of display desired. A particle may comprise a metallic oxide pigment or a carbon pigment or titanium oxide coated with a colorless resin to provide the bulk and for controlling the charge. While positively charged particles have been tuilized in the preceding discussion, negatively charged particles and neutral particles may also be utilized. Typically the particles are of the order of one micron in diameter and dispersed in the diluent in the ratio of approximately one percent by weight. At the present time, positively charged particles are more readily obtained and controlled. With the electrophoretic particles dispersed in a liquid, the liquid may serve as the X-ray absorber and electron and positive ion emitter. Alternatively, the particles themselves may serve as the absorber and emitter. The liquid containing the particles should be relatively dense to help prevent precipitation of the particles. Typical suitable liquids are those containing bromine or iodine atoms which also render them good X-ray absorbers. Dibromotetrafluoroethane and Di-Iodomonofluoromethane are suitable. Other standard dispersant liquids such isopar may be used.

We claim:

1. In an electronradiography imaging chamber for providing a visual image, the combination of:
   first and second electrodes;
   means for supporting said electrodes in spaced relation with a gap there between, with said first electrode being relatively transparent optically and having a dielectric layer at the surface thereof facing said second electrode;
   an X-ray absorber and electron and positive ion emitter in said gap, with X-ray radiation entering said gap being absorbed and providing electrons and positive ions in said gap;

a plurality of electrophoretic particles in said gap; and means for connecting an electric power source across said electrodes for attracting electrons toward one electrode and positive ions toward the other depending upon the plurality of the power source and forming an electrostatic charge image, with said particles being selectively deposited at said dielectric layer as a function of said electrostatic charge image forming a visual image viewable through said first electrode.

2. An imaging chamber as defined in claim 1 wherein said second electrode is relatively transparent optically, and including means for directing light through said electrodes with the deposited particles blocking light transmission.

3. An imaging chamber as defined in claim 1 including means for directing light onto said first electrode with the deposited particles reflecting light.

4. An imaging chamber as defined in claim 1 wherein said first electrode includes a support plate with an electrically conducting layer thereon, and including first means for directing light into said plate from an edge with the deposited particles scattering light.

5. An imaging chamber as defined in claim 4 with said light directed into said plate at an angle to produce substantially total reflection of the light internally of the plate except for that scattered by the deposited particles.

6. An imaging chamber as defined in claim 5 including:

second means for directing light onto said first electrode with the deposited particles reflecting light; and means for selectively energizing said first and second light directing means.

7. An imaging chamber as defined in claim 1 wherein said electrophoretic particles are positively charged.

8. An imaging chamber as defined in claim 1 wherein said electrophoretic particles are negatively charged.

9. An imaging chamber as defined in claim 1 wherein said electrophoretic particles are electrically neutral.

10. An imaging chamber as defined in claim 1 wherein said electrophoretic particles have a bulk of a magnitude greater than that of said electrons and positive ions so that said electrons and positive ions move across said gap at a faster rate than said electrophoretic particles.

11. An imaging chamber as defined in claim 1 wherein said electrophoretic particles have a charge condition such that one of said electrons and positive ions attach to particles to change the charge of the particles.

12. An imaging chamber as defined in claim 1 wherein said electrophoretic particles are suspended in a liquid dispersant comprising said absorber and emitter.

13. An imaging chamber as defined in claim 1 wherein said electrophoretic particles are suspended in a liquid dispersant with said particles comprising said absorber and emitter.

14. An imaging chamber as defined in claim 1 wherein said absorber and emitter is a liquid and said electrophoretic particles are suspended therein.

15. An imaging chamber as defined in claim 1 including an anisotropic plate between said first and second electrodes dividing said gap into first and second gap portions, with said first gap portion between said anisotropic plate and said first electrode and with said separate second gap portion between said anisotropic plate and said second electrode, and with said electrophoretic particles suspended in a liquid in said first gap portion and with said absorber and emitter in said second gap portion.

16. An imaging chamber as defined in claim 15 wherein said absorber and emitter is a gas.

17. An imaging chamber as defined in claim 15 wherein said absorber and emitter is a liquid.

18. An imaging chamber as defined in claim 15 wherein said anisotropic plate comprises a plurality of electrical conducting pins spaced from each other in an electrical insulating support.

19. An imaging chamber as defined in claim 18 wherein said pins are shorter than said insulating support is thick providing cavities at the pin ends adjacent said first electrode with said cavities forming the major portion of said first gap portion.

20. An imaging chamber as defined in claim 1 including control means for cyclically actuating said imaging chamber to provide real time visual imaging and including means for energizing an X-ray source for a short portion of each cycle and simultaneously energizing an electric power source for attracting electrons and positive ions, and energizing a light source for viewing the deposited particles for a subsequent portion of the cycle.

21. An imaging chamber as defined in claim 20 wherein said control means includes means for connecting a relatively high voltage supply to said electrodes while the X-ray source is energized and then connecting a relatively low voltage supply to said electrodes.

22. An imaging chamber as defined in claim 21 wherein said control means includes means for connecting a voltage supply of reverse polarity prior to energizing the X-ray source.

23. An imaging chamber as defined in claim 20 wherein said control means includes means for connecting a voltage supply of reverse polarity prior to energizing the X-ray source.

* * * * *